United States Patent
Busch et al.

(10) Patent No.: US 7,461,673 B2
(45) Date of Patent: Dec. 9, 2008

(54) SEAL DEVICE FOR A TANK FILLER NECK IN VEHICLES

(75) Inventors: Marcus Busch, Lehrte (DE); Etzhard Bultmann, Wedemark (DE)

(73) Assignee: Alfred Engelmann Holding GmbH, Wedemark (DE)

( * ) Notice: Subject to any disclaimer, the term of this patent is extended or adjusted under 35 U.S.C. 154(b) by 520 days.

(21) Appl. No.: 10/974,018

(22) Filed: Oct. 27, 2004

(65) Prior Publication Data

US 2007/0034286 A1 Feb. 15, 2007

(30) Foreign Application Priority Data

Oct. 29, 2003 (DE) .................. 103 50 471

(51) Int. Cl.
 *B65B 1/04* (2006.01)
 *B65B 3/00* (2006.01)

(52) U.S. Cl. .............. 141/350; 141/348; 141/349; 220/86.2; 220/822; 220/823

(58) Field of Classification Search .......... 141/301, 141/348–350; 220/86.2, 203.1, 245, 246, 220/816, 821–824; 251/48–55, 64
See application file for complete search history.

(56) References Cited

U.S. PATENT DOCUMENTS

| | | | |
|---|---|---|---|
| 1,152,286 A * | 8/1915 | Brownson ............... 220/822 |
| 2,145,758 A * | 1/1939 | Fellows et al. ............. 220/822 |
| 2,319,145 A * | 5/1943 | Loomis ..................... 425/422 |
| 4,254,888 A * | 3/1981 | Chandler ................... 220/694 |
| 4,377,245 A * | 3/1983 | Patty ......................... 220/822 |
| 4,948,103 A * | 8/1990 | Bowden et al. ............. 267/34 |
| 5,104,372 A * | 4/1992 | Rossetto ...................... 494/38 |
| 5,435,358 A * | 7/1995 | Kempka et al. ............ 141/312 |
| 5,749,122 A * | 5/1998 | Herbst ........................... 16/70 |
| 6,279,626 B1 | 8/2001 | Schmitt et al. |
| 6,443,195 B2 * | 9/2002 | Palvoelgyi et al. ......... 141/350 |
| 6,539,990 B1 * | 4/2003 | Levey et al. ............... 141/301 |
| 6,880,594 B1 * | 4/2005 | Benjey ....................... 141/350 |
| 7,007,726 B1 * | 3/2006 | Martin et al. .............. 141/350 |
| 7,163,037 B2 * | 1/2007 | Walkowski ................ 141/350 |

FOREIGN PATENT DOCUMENTS

| DE | 1 9543034 | 5/1997 |
|---|---|---|
| DE | 1 9747986 | 5/1999 |
| DE | 1 9923046 | 11/2000 |
| DE | 202 06 097 U1 | 7/2003 |

\* cited by examiner

*Primary Examiner*—Timothy L Maust
(74) *Attorney, Agent, or Firm*—Greenblum & Bernstein, P.L.C.

(57) ABSTRACT

A closure device for tank filler necks in motor vehicles. The closure device has the object of configuring the tank filling operation to be more comfortable. This objective is achieved in that at least two closure elements are swivel-mounted on the tank filler neck, the closure elements having insertion bevels on their top that are designed in such a way that when a fuel nozzle is placed on them the closure elements swivel and open the tank filler neck.

22 Claims, 1 Drawing Sheet

SEAL DEVICE FOR A TANK FILLER NECK IN VEHICLES

FIELD OF THE INVENTION

The invention relates to a closure device for tank filler necks in motor vehicles.

BACKGROUND DESCRIPTION

Closure devices for tank filler necks in motor vehicles designed as screw-on caps, i.e., lockable screw-on caps, are known in the art. Normally, the tank filler neck and the screw-on cap are concealed behind a tank flap that continues the contour of the vehicle body and as a rule is painted the same color as the car.

Opening the tank filler neck is sometimes uncomfortable, especially in motor vehicles with diesel engines, because fuel residues together with dust collects on the screw-on cap, which causes the vehicle user to get soiled.

SUMMARY OF THE INVENTION

The object of the invention is to provide a closure device for tank filler necks in motor vehicles that enable a simple and comfortable tank-filling operation.

This objective is achieved via a closure device for tank filler necks in motor vehicles in which at least two closure elements are swivel mounted on the tank filler necks. The closure elements have insertion bevels on their top that are designed in such a way that, when a fuel nozzle is placed on them the closure elements swivel and open the tank filler neck. In this way, a securely closed tank filler neck may be opened without direct contact with the hands. By placing the fuel nozzle on them and exerting a certain pressure in the direction of the tank filler neck, the closure elements are pressed apart and clear the access to the tank filler neck for the fuel nozzle.

The insertion bevels are advantageously designed as conical, roof-shaped, pyramidal or like a hyperboloid in order to enable a smooth and simple opening of the closure elements. What is important in this context is that the insertion bevels taper in the direction of the tank filler neck so that when there is movement of the fuel nozzle placing it on the closure elements they are pressed apart.

In order to ensure a secure closure of the tank filler neck after tank filling and to keep it closed during operation of the vehicle, the closure elements are spring-loaded against the opening movement. The spring is designed, for example, as a torsion spring.

One embodiment of the invention provides that the swivel axis of the closure elements is oriented essentially parallel to the longitudinal extension of the tank filler neck so that when there is a two-piece design of the closure element, a pincer-like opening movement is produced. The closure elements can then be mounted on the same axis. Alternatively, the swivel axes may be oriented perpendicular to the longitudinal extension of the tank filler neck so that the closure elements are individually mounted and close the tank filler neck in the manner of a clamshell.

Advantageously, the closure elements have lips, or lips and recesses, that overlap each other in the closed state and thereby reinforce the sealing effect.

It is also provided that correspondingly designed projections and recesses are present on the closure elements and the tank filler necks that overlap each other in the closed state, so that as gas-tight a closure of the tank filler neck as possible is realized. In order to improve the gas-tightness and the closure, seals are disposed one on top of the other at the contact areas of the closure elements and/or at the contact areas of the closure elements for the tank filler necks. Preferably, the seals are designed as rubber seals.

In order to prevent a rapid folding up or snapping shut of the closure elements, braking devices are assigned to the closure elements that cause a delayed opening of the tank filler neck. The braking devices are preferably designed as silicone brakes, whereby it is possible for the braking effect in the opening and closing direction to be variable.

In order to be able to simply place a pre-fabricated module on the tank filler neck, the closure elements and preferably also the spring elements and/or the braking devices are mounted on a carrier, which on its part is attachable to the tank filler neck. Provided that the carrier is placed on the tank filler neck opening from the top, the carrier also has an opening through which the fuel nozzle penetrates and which is closed by the closure elements.

BRIEF DESCRIPTION OF THE DRAWINGS

An exemplary embodiment of the invention is explained in detail below with reference to the FIG. 1, in which a closure device is represented in perspective view.

DETAILED DESCRIPTION OF EMBODIMENTS OF THE INVENTION

Figure 1:
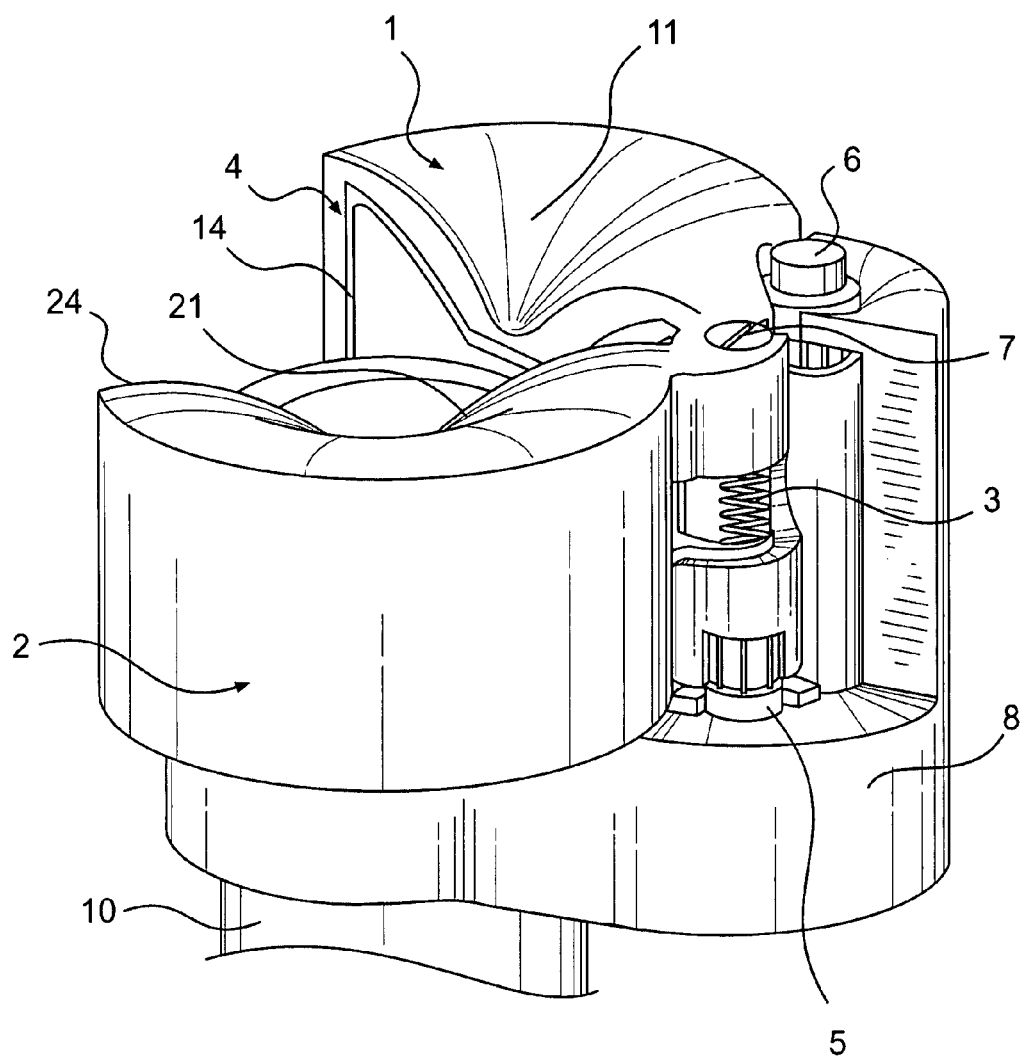

Referring to FIG. 1, the closure device according to the depicted exemplary embodiment has two closure elements 1, 2 that are swivel-mounted about an axis parallel to the longitudinal extension of a tank filler neck 10. The swivel axis essentially corresponds to the center axis of a screw 7 on which closure elements 1, 2 are mounted. Mounted around screw 7 is a torsion spring 3, which loads closure elements 1, 2 in the direction toward each other, so that in the normal state closure elements 1, 2 rest against each other and close tank filler neck 10. Seals 4, which ensure a gas-tight closure even at the impact points of closure elements, are disposed at contact areas 14, 24 of closure elements 1, 2. It is also provided that there is an overlap, for example, using corresponding lips and recesses between closure elements 1, 2 in order to strengthen the sealing effect.

Insertion bevels 11, 21, which in the present case are designed in the form of a hyperboloid, are configured on the top of closure elements 1, 2. Alternatively, insertion bevels 11, 21 may also be formed with straight walls as pyramids, roof-shaped or in the shape of a wedge; likewise, a conical design of insertion bevels 11, 21 is possible.

By virtue of insertion bevels 11, 21 tapering in the direction of tank filler neck 10, the placement of a fuel nozzle and exertion of a certain pressure in the direction of tank filler neck 10 produces a transverse force component that presses closure elements 1, 2 apart against the spring force that is applied by spring 3. Closure elements 1, 2 then swivel about a screw 7 and open the opening of tank filler neck 10. The fuel nozzle can slide into the tank filler neck and the tank filling operation can be carried out. After completion of the tank filling operation, the fuel nozzle is pulled out and the spring force of spring 3 causes closure elements 1, 2 to close in a pincer-like manner around tank filler neck 10 and seal it off.

In order to effect a damped movement with respect to closure elements 1, 2, both during opening and during closing, they are each assigned braking devices 5, 6, which are depicted in the present exemplary embodiment as silicone brakes. In this context, a torque is transferred from closure elements 1, 2 to braking devices 5, 6, each of which delays or damps the movement in the opening or closing direction.

In the present example, closure elements 1, 2, spring 3 and braking devices 5, 6 are disposed on a carrier 8 and together with it form a pre-assembled module, which is simply placed on filler neck 10 in the context of a final assembly and must be attached to it. In this way it is possible to completely pre-assemble the closure device and supply one of them at the final assembly location.

As an alternative to the depicted exemplary embodiment, it is possible in order to open tank filler neck 10 or close it for closure elements 1, 2 to be individually mounted and spread apart or come together like a clamshell or spherical surface segments with corresponding insertion bevels.

Likewise, it is possible to provide more than two closure elements, whereupon the required structural space is reduced because of the slight cantilever of the closure elements.

The invention claimed is:

1. A closure device for a tank filler neck in motor vehicles, comprising at least two closure elements adapted to be swivel-mounted on the tank filler neck, the at least two closure elements each having insertion bevels on a top thereof such that when a fuel nozzle is placed on the insertion bevels the at least two closure elements swivel and open the tank filler neck, wherein the at least two closure elements have projections and/or recesses that overlap each other in a closed state.

2. The closure device as described in claim 1, wherein the insertion bevels are a conical, roof-like or pyramidal shape or as a hyperboloid.

3. The closure device as described in claim 1, wherein the at least two closure elements are spring-loaded against an opening movement.

4. The closure device as described in claim 1, wherein the at least two closure elements have a swivel axis which is oriented essentially parallel to a longitudinal extent of the tank filler neck.

5. The closure device as described in claim 1, wherein the at least two closure elements comprise lips that overlap each other in a closed state.

6. The closure device as described in claim 1, further comprising seals disposed at contact areas between at least one of the closure elements and at the contact areas between the closure elements and the tank filler neck.

7. The closure device as described in claim 1, wherein at least one of spring elements, braking devices and the at least two closure elements are mounted on a carrier that is attached to the tank filler neck.

8. The closure device as described in claim 1, wherein the insertion bevels taper in a direction of the tank filler neck.

9. The closure device as described in claim 1, further comprising a torsion spring for spring loading the at least two closure elements.

10. The closure device as described in claim 1, further comprising a swivel axis of the at least two closure elements oriented perpendicular to a longitudinal extension of the tank filler neck so that the at least two closure elements are individually mounted and close the tank filler neck in a clamshell manner.

11. The closure device as described in claim 1, wherein the at least two closure elements have lips, or lips and recesses, that overlap each other in a closed state to reinforce a sealing therebetween.

12. The closure device of claim 1, wherein the at least two closure elements each have downward extending walls configured to extend over a sidewall of the tank filler neck, the downward extending walls and the a portion under the insertion bevels including sealing members which are designed to engage with one another when the at least two closure elements are in the closed state.

13. A closure device for a tank filler neck in motor vehicles, comprising at least two closure elements adapted to be swivel-mounted on the tank filler neck, the at least two closure elements having insertion bevels on a top thereof such that when a fuel nozzle is placed on the insertion bevels the closure elements swivel and open the tank filler neck, and braking devices assigned to the at least two closure elements for delayed movement during opening and closing of the tank filler neck.

14. The closure device as described in claim 13, wherein the braking devices are silicone brakes.

15. A closure device, comprising spring loaded closure elements adapted to be swivel mounted on a tank filler neck, the spring loaded closure elements include tapered insertion bevels designed in such a way that, when a fuel nozzle is placed on them, the spring loaded closure elements swivel and open the tank filler neck, and a swivel axis of the spring loaded closure elements is one of oriented perpendicular to a longitudinal extension of the tank filler neck so that the spring loaded closure elements are individually mounted and close the tank filler neck in a clamshell manner.

16. The closure device as described in claim 15, wherein the swivel axis of the spring loaded closure elements is oriented substantially parallel to a longitudinal extension such that the spring loaded closure elements are mounted on a same axis.

17. The closure device as described in claim 15, further comprising seals disposed one on top of the other at contact areas of the spring loaded closure elements.

18. The closure device as described in claim 15, wherein at least one of elements, braking devices and the spring loaded closure elements are mounted on a carrier that is attached to the tank filler neck.

19. A closure device, comprising spring loaded closure elements swivel mounted on tank filler necks, the spring loaded closure elements include tapered insertion bevels designed in such a way that, when a fuel nozzle is placed on them, the spring loaded closure elements swivel and open the tank filler neck, and braking devices assigned to the spring loaded closure elements that cause a delayed opening of the tank filler neck.

20. A closure device, comprising spring loaded closure elements having a top portion configured to cover an opening of a filler neck and sidewalls configured to surround an outer wall of the filler neck, the spring loaded closure elements close about the top and side of the filler neck in a clamshell manner, and swivel to open the tank filler neck when a fuel nozzle is placed on insertion bevels on a top surface thereof.

21. The closure device of claim 20, further comprising a swivel axis of the spring loaded closure elements oriented perpendicular to a longitudinal extension of the tank filler neck so that the spring loaded closure elements are individually mounted.

22. The closure device of claim 20, wherein the spring loaded closure elements are prefabricated on a carrier which is configured to be mounted on the outer wall of the tank filler neck.

* * * * *